(12) United States Patent
Herman et al.

(10) Patent No.: US 11,605,000 B2
(45) Date of Patent: Mar. 14, 2023

(54) VEHICLE DETECTION OF MISSING BODY PARTS

(71) Applicant: Ford Global Technologies, LLC, Dearborn, MI (US)

(72) Inventors: David Michael Herman, Oak Park, MI (US); Brian Quinn Kettlewell, Cambridge (CA)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 17/075,816

(22) Filed: Oct. 21, 2020

(65) Prior Publication Data

US 2022/0121950 A1  Apr. 21, 2022

(51) Int. Cl.
| | | |
|---|---|---|
| G06N 3/08 | (2023.01) | |
| G06N 3/084 | (2023.01) | |
| G06N 3/04 | (2023.01) | |
| G07C 5/08 | (2006.01) | |
| G07C 5/00 | (2006.01) | |

(52) U.S. Cl.
CPC ............ G06N 3/084 (2013.01); G06N 3/04 (2013.01); G07C 5/008 (2013.01); G07C 5/0808 (2013.01)

(58) Field of Classification Search
CPC .......... G06N 3/084; G06N 3/04; G06N 3/045; G06N 5/01; G06N 20/20; G07C 5/008; G07C 5/0808; G01S 13/04; G01S 7/4004; G01S 13/865; G01S 13/867
See application file for complete search history.

(56) References Cited

U.S. PATENT DOCUMENTS

| | | | | |
|---|---|---|---|---|
| 8,788,220 B2* | 7/2014 | Soles | .......................... | F41J 5/04 |
| | | | | 702/41 |
| 10,059,292 B2* | 8/2018 | Kuga | ....................... | G01S 17/42 |
| 2014/0309805 A1* | 10/2014 | Ricci | ..................... | G06F 16/951 |
| | | | | 701/1 |
| 2017/0350970 A1* | 12/2017 | Saito | ........................ | G01S 13/42 |
| 2022/0003833 A1* | 1/2022 | Arakawa | ............. | G01S 13/4454 |

FOREIGN PATENT DOCUMENTS

| | | |
|---|---|---|
| JP | 4353008 B2 | 8/2009 |
| JP | 6560307 B2 | 7/2019 |
| WO | 2018047663 A1 | 3/2018 |

OTHER PUBLICATIONS

Guetlein, J., et al., "Calibration Strategy for a TDM FMCW MIMO Radar System," IEEE, IEEE International Conference on Microwaves, Communications, Antennas and Electronic Systems, 2013, 5 pages.

* cited by examiner

*Primary Examiner* — Sizo B Vilakazi
(74) *Attorney, Agent, or Firm* — Frank A. MacKenzie; Bejin Bieneman PLC

(57) ABSTRACT

A computer includes a processor and a memory. The memory stores instructions executable by the processor such that the computer is programmed to input to a trained machine learning program, (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion, and to output from the trained machine learning program a determination concerning a presence of the radar radome.

20 Claims, 7 Drawing Sheets

VEHICLE DETECTION OF MISSING BODY PARTS

BACKGROUND

A vehicle may include one or more radar sensors to detect objects, e.g., in an area outside the vehicle. A radar sensor for detecting objects outside a vehicle may be mounted to the vehicle body, fascia, etc. For various reasons, e.g., to provide a pleasing appearance of a vehicle, the radar sensor(s) may be mounted to the vehicle body so as to not be seen on the body exterior surface. A radar sensor is typically calibrated to account for any vehicle component(s) that covers the radar sensor and that may affect passing radar waves. However, a vehicle component that covers a radar sensor may be missing, e.g., due to an impact or collision, etc., thus causing the radar sensor to output incorrect data, e.g., reporting an object in a wrong location.

DETAILED DESCRIPTION

Introduction

Figure 1:
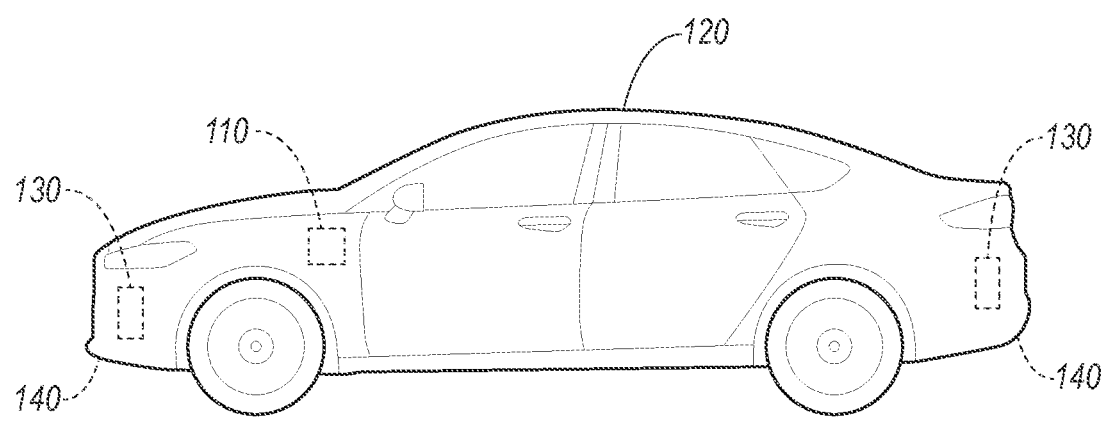
FIG. 1 is a diagram of an exemplary vehicle with a computer and radar sensors.

Disclosed herein is a computer including a processor and a memory. The memory stores instructions executable by the processor such that the computer is programmed to input to a trained machine learning program, (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion, and to output from the trained machine learning program a determination concerning a presence of the radar radome.

The second sensor may include a camera sensor or lidar sensor, and the instructions further include instructions to receive data from the second sensor; and to apply the trained neural network to the received second sensor data, wherein the machine learning program is further trained to output the determination concerning the presence of the radar radome based on the received second sensor data.

The instructions may further include instructions to receive vehicle collision data specifying whether a collision occurred, and to apply the machine learning program to the received vehicle collision data, wherein the machine learning program is further trained to output the determination concerning the presence of the radar radome based on the received vehicle collision data.

The instructions may further include instructions to, upon determining a lack of the radar radome, to store a diagnostic code in a computer memory, to adjust one or more calibration parameters of the radar sensor, to determine an updated sensor fusion error based at least in part on the adjusted one or more calibration parameters, and to stop adjusting the one or more calibration parameters upon determining that the updated sensor fusion error is less than a specified error threshold.

The instructions may further include instructions to increase at least one of an operating frequency or an operating power level of the radar sensor upon determining, based on the weather data, a presence of moisture on the radar sensor.

The instructions may further include instructions to adjust an operating parameter of a radar sensor blockage detection algorithm based on the weather data.

The instructions may further include instructions, upon determining that (i) based on stored diagnostic code the radar radome is missing and (ii) based on the machine learning program output, the radar radome is present, to output a message, to a user device, including an instruction to adjust one or more calibration parameters of the radar sensor.

The instructions may further include instructions to deactivate a vehicle autonomous operation upon determining that the radar radome is missing.

The instructions may further include instructions to determine the radar detection range based on a number of objects detected by each of the radar sensor and the second sensor, in a plurality of ranges from the vehicle.

The instructions may further include instructions to train the machine learning program by applying a set of training data including the inputs and an expected output including one of "the radar radome is missing" or "the radar radome is present" for each set of the training data.

The instructions may further include instructions to determine the weather data include data concerning snow, rain, or wind.

The instructions may further include instructions to determine the aerodynamic drag of the vehicle based on data including a vehicle speed, a vehicle fuel consumption, an engine torque, and a road slope.

Further disclosed herein is a method, comprising inputting to a trained machine learning program, (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion, and outputting from the trained machine learning program a determination concerning a presence of the radar radome.

The method of may further include receiving data from the second sensor, and applying the trained neural network to the received second sensor data, wherein the machine learning program is further trained to output the determination concerning the presence of the radar radome based on the received second sensor data.

The method may further include, upon determining a lack of the radar radome, storing a diagnostic code in a computer memory, adjusting one or more calibration parameters of the radar sensor, determining an updated sensor fusion error based at least in part on the adjusted one or more calibration parameters, and stopping adjusting the one or more calibration parameters upon determining that the updated sensor fusion error is less than a specified error threshold.

The method may further include increasing at least one of an operating frequency or an operating power level of the radar sensor upon determining, based on the weather data, a presence of moisture on the radar sensor.

The method may further include adjusting an operating parameter of a radar sensor blockage detection algorithm based on the weather data.

The method may further include, upon determining that (i) based on stored diagnostic code the radar radome is missing and (ii) based on the machine learning program output, the radar radome is present, outputting a message, to a user device, including an instruction to adjust one or more calibration parameters of the radar sensor.

The method may further include training the machine learning program by applying a set of training data including the inputs and an expected output including one of "the radar radome is missing" or "the radar radome is present" for each set of the training data.

The method may further include determining the aerodynamic drag of the vehicle based on data including a vehicle speed, a vehicle fuel consumption, an engine torque, and a road slope.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

System Elements

A radome is a cover or housing for a radar antenna through which radio waves are transmitted to and/or received by the radar antenna. In a vehicle, a radar radome can comprise parts of the vehicle, e.g., one or more of a sensor packaging, a bumper, a fascia, etc. A missing radar radome, may cause a change in the transmitted and received radar waves and thereby the results object detection algorithms produced by a radar sensor compared to an intact radar radome. Such a change is typically unexpected and undesired, and can make difficult or impossible operation of vehicle components that depend on radar data. As set forth herein, a computer can be programmed to input to a machine learning program, e.g., a trained neural network, data to obtain as output a determination concerning a presence of the radar radome. The input data can include (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion.

FIG. 1 illustrates a vehicle 100 including a computer 110, a body 120, a sensor 130, radome 140, actuators, and other components discussed herein below. The vehicle 100 may be powered in a variety of known ways, e.g., with an electric motor and/or internal combustion engine. FIG. 1 shows a plurality of sensors 130 for purposes of illustration but one or more sensors 130 are possible.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering. As one example, the computer 110 may actuate the vehicle 100 brakes in response based on data from the radar sensor(s) 130 indicating an imminent crash with an object on the vehicle 100 driving path.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

Via the vehicle 100 network, the computer 110 may transmit messages to various devices in the vehicle 100 and/or receive messages from the various devices, e.g., controllers, actuators, sensors, etc., including sensors 130. Alternatively or additionally, in cases where the computer 110 comprises multiple devices, the vehicle communication network may be used for communications between devices represented as the computer 110 in this disclosure. Further, as mentioned below, various controllers and/or sensors, e.g., the radar sensors 130, may provide data to the computer 110 via the vehicle communication network.

Controllers, as that term is used herein, are devices with memories and processors that typically are programmed to control a specific vehicle subsystem. Examples include a powertrain controller, a brake controller, and a steering controller. A controller may be an electronic control unit (ECU) such as is known, possibly including additional programming as described herein. The controllers may be communicatively connected to and receive instructions from the computer 110 to actuate subsystem vehicle components, e.g., braking, steering, powertrain, etc., according to the instructions. For example, the brake controller may receive instructions from the computer 110 to operate the brakes of the vehicle.

The actuators are implemented via circuits, chips, or other electronic components that can actuate various vehicle subsystems in accordance with appropriate control signals as is known. The actuators, therefore, may be used to control braking, acceleration, and steering of the host vehicle 100. Additionally, the actuators may control access to the vehicle 100, e.g., release/lock doors. The control signals used to control the actuators may be generated by the computer 110, a control unit located in the vehicle 100, e.g., the brake controller, etc.

The vehicle 100 may include various sensors to provide data via the vehicle communications bus. For example, a radar sensor 130 may provide object detection, i.e., data including dimensions and/or relative location of objects outside the vehicle 100 within a field of view of the radar sensor(s) 130. The field of view is an area in which the radar sensor 130 can detect objects. The radar sensor(s) 130 transmit radio-magnetic beams, receive reflections of the transmitted beams, and measure a distance to an object reflecting the beams based at least on a time-to-travel, i.e., a time interval between transmission of a beam and receiving a reflection, i.e., an echo, of the same beam by the radar sensor 130. Additionally or alternatively, a frequency-modulated continuous wave (FMCW) radar sensor 130 may transmit electromagnetic signals with a frequency continuously varying up and down over a fixed period of time by a modulating signal. Frequency differences between the receive signal and the transmit signal increase with delay, and hence with distance. Thus, the computer 110 may determine a distance to an object based on the determined frequency difference.

A radar sensor 130 may include one or more antennas, and electronic components such as chips, analog-to-digital converter, digital-to-analog converter, radio-magnetic amplifier, etc. The radar sensor 130 may include an array of antennas oriented in various respective directions. The computer 110 may be programmed to receive reflections of radio-magnetic beams transmitted by an antenna of a radar sensor 130 mounted to a vehicle 100 body 120. The computer 110 can be programmed to detect objects based on received reflections of the transmitted beams.

Figure 2A:
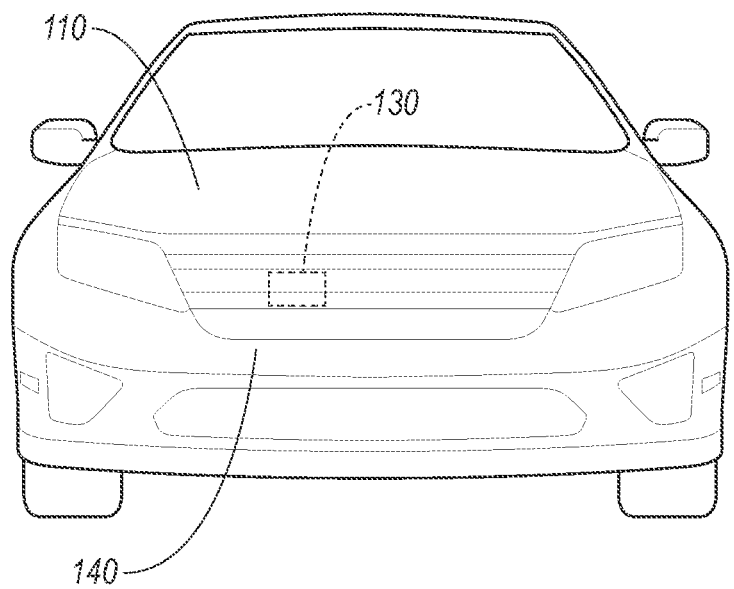
FIG. 2A shows a perspective front view of a vehicle with a radar sensor radome.
Figure 2B:
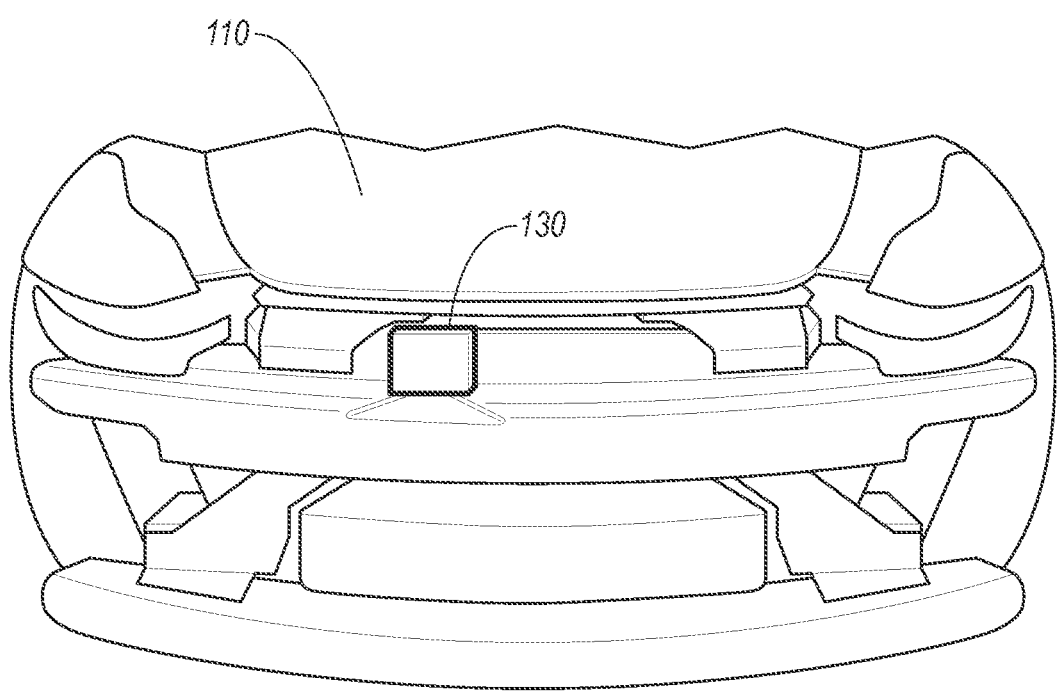
FIG. 2B shows a perspective front view of the vehicle of FIG. 2A with a missing sensor radome.

The vehicle 100 body 120 may include a structure including various parts, e.g., roof, pillars, chassis, front end, rear end, etc., mechanically connected to one another by, e.g., welding, screws, adhesives, etc. The vehicle 100 body 120 may include bumpers such as a front bumper and a rear bumper mechanically coupled to the body 120 front and rear ends. A radome 140, as shown in FIG. 2A, can include one or more parts, structures, or assemblies of a vehicle 100 such as a bumper, a sensor packaging, cover, housing, or assembly, a fascia, etc., through which an electromagnetic-beam of a radar sensor 130 is transmitted exterior, i.e., beyond the body, of the vehicle 100, and/or through which reflections of a magnetic beam so transmitted is received. Radome 140 material, thickness, geometry, etc., may be chosen to minimize absorption, reflection, deflection, etc., of radar sensor 130 waves while addressing structural, aesthetic, aerodynamic, and/or other vehicle 100 requirements. The vehicle body 120 may be formed of metal parts such as steel and/or aluminum sheets, composite materials, plastic, etc. As shown in FIG. 2B, after a vehicle 100 impact, a vehicle 100 part such a radome 140 may be missing. Additionally or alternatively, a radome 140 may be missing due to other reasons such as (i) an inclement weather condition, e.g., a storm, and/or (ii) a loose mechanical connection, e.g., loose screws, between the radome 140 and the vehicle 100 body 120, etc.

Figure 3:
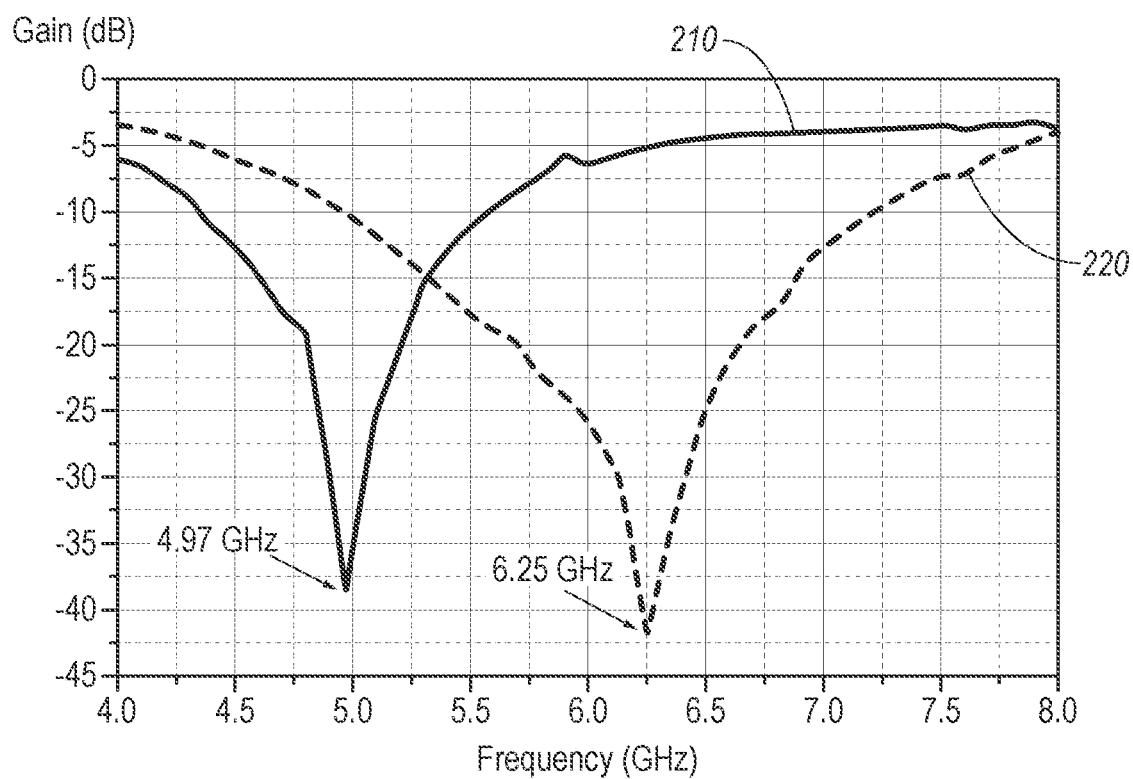
FIG. 3 is (i) a graph showing a change of radar sensor gain versus frequency when radar sensor radome is present and (ii) another graph showing changes of gain versus frequency when the radar sensor radome is missing.

A radar sensor 130 may determine a distance to an object based on a "time-to-travel" to an object. A "time-to-travel" with respect to an object refers to an amount of time in which a transmitted beam travels from an antenna to the object, the object reflects the beam, and a reflection of the transmitted beam is received by the antenna. Additionally or alternatively, for a FMCW radar sensor 130, a time delay of a return chirp gives a distance to an object. A change in the return frequency gives relative radial velocity between the radar sensor 130 and an object. Radar sensor 130 output may be a 2D or 3D, e.g., a multi-input multi-output (MIMO) radar. Thus, a time-to-travel may depend on a distance between an antenna and an object. Additionally or alternatively, the computer 110 may be programmed to detect the vehicle 100 body 120 parts based on a time-to-travel, e.g., all objects with a time-to-travel less than a predetermined time threshold may be considered as a part of the vehicle 100 body 120. The default base reflection pattern of a radar sensor 130 may include data specifying characteristics, e.g., time-to-travel, signal amplitude, frequency, etc., of reflections expected to be received from body 120 parts such as the radome 140. A missing radome 140 typically results in a change of the base reflection pattern. FIG. 3 shows an exemplary graph 210 which illustrates changes of radar sensor 130 gain versus frequency when the radome 140 is present, whereas an exemplary graph 220 illustrates changes of radar sensor 130 gain versus frequency when the radome 140 is missing. Additionally or alternatively, missing radome 140 may result in changes a return coefficient as a function of angle, and/or return intensity versus distance, frequency, and/or angle.

A radar sensor 130 operates based on received reflections from objects, e.g., a second vehicle, a building, etc. A radome 140 may be formed of materials which are substantially transparent (e.g., 90% or more of signals pass through the radome while 10% or less is reflected) to radar electromagnetic signals. However, the radar sensor 130 antenna may receive reflections from the radome 140; a portion of radar waves may be reflected or absorbed by the radome 140 material as it is transmitted or received, and/or another portion of waves may be deflected from a nominal direction of waves. Such reflections from the radome 140, herein referred to as "default base reflections," are expected to be received permanently from the radar sensor 130 and not to indicate a presence of an object exterior of the vehicle 100. Additionally, a presence of the radome 140 may affect the reflections received from objects, e.g., a second vehicle, exterior of the vehicle 100. The computer 110 may be programmed to store internal calibration data for radar sensor 130 operation. Internal calibration parameters are parameters specific to physical characteristics of a sensor 130, e.g., operation frequency, signal power level, relationship between received reflections and location of respective object relative to a sensor 130 coordinate system. Thus, internal calibration parameters of a sensor typically do not change based on changing a location and/or pose of the sensor. Thus, when a radome 140 is missing, detection of exterior objects by the radar sensor 130 may be impaired or prevented.

Figure 4:
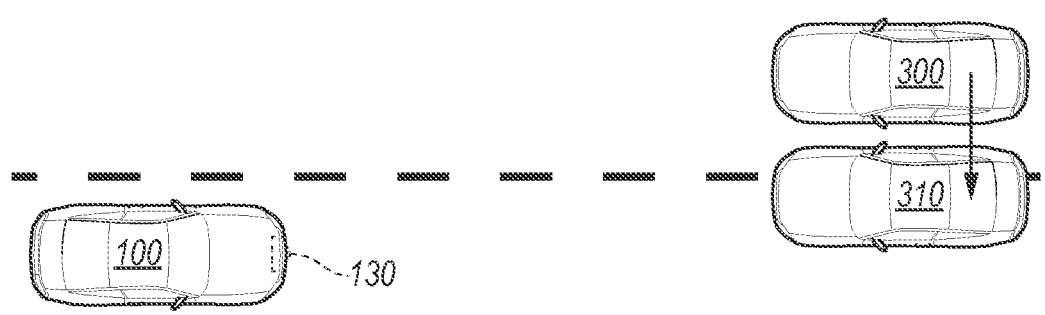
FIG. 4 is a diagram showing the vehicle of FIG. 1 operating a radar with a missing radar sensor radome.

FIG. 4 illustrates a scenario in which a missing radome 140 leads to incorrectly detecting an object 310, e.g., a vehicle, instead of an actual object 300, e.g., the vehicle at its actual location rather than a location of the detected object 310. For example, as show in FIG. 4, the actual object 300 is in a lane different from a host vehicle 100 lane, while the incorrectly detected object 310 is in a same lane as the vehicle 100. Thus, the computer 110 may provide incorrect or undesired output upon falsely detecting the object 310, e.g., may actuate the vehicle 100 to brake because of the incorrectly detected object 310. "Incorrectly detected," in the present context includes (i) determining a wrong location (object 310) for an existing object 300, (ii) failing to detect an object, and/or (iii) detecting a "ghost" object, i.e., an object that is not physically present. Additionally or alternatively, a noise suppression algorithm may be overly aggressive when the radome 140 is not present, which may result in misdetection of an object.

To avoid a false detection, the computer 110 may be programmed to determine whether the radome 140 of a sensor 130 is present, and to operate the vehicle 100 based on such determination. The computer 110 can be programmed to input to a machine learning program, e.g., a trained neural network, a gradient boosted tree network, etc., (1) a sensor fusion error, (2) a radar sensor 130 detection range, (3) an amount of reflection from a radar sensor 130 radome 140, (4) weather data, and (5) aerodynamic data that measures an aerodynamic drag opposing a vehicle motion, and to output from the trained neural network a determination concerning a presence of the radar sensor 130 radome 140. The computer 110 may ignore radar sensor 130 data upon determining that the radar sensor 130 radome 140 is not present. The computer 110 may be programmed to determine whether the radome 140 is missing using one or more machine learning programs, e.g., one or more neural networks, e.g., a convolutional neural network (CNN). A CNN is a software program that can be implemented on a computing device that can be trained to input vehicle 100 data and output data determining whether a vehicle 100 sensor 130 radome 140 is missing. A CNN includes a plurality of convolutional layers that extract hidden features from input data of a vehicle 100 which are passed to a plurality of fully-connected layers that transform the hidden features into a determination of a radome 140 presence. Additionally or alternatively, filtering mechanism such as a Kalman, Bayesian, etc., may be used to filter inputs to the machine learning program. In another example, as an alternative to a trained neural network, a scoring function may be to output a likelihood of radome 140 missing, e.g., in a scale of 0 (present) to 1 (missing) based on inputs including same inputs discussed above, e.g., sensor fusion error, radar sensor 130 detection range, etc.

A CNN can be trained to determine whether a sensor 130 radome 140 is present by processing a plurality of inputs including (i) a sensor fusion error that measures a statistical correlation of data received from a radar sensor and a second sensor in a vehicle, (ii) a radar detection range, (iii) an amount of reflection from a radar radome, (iv) weather data, (v) aerodynamic data that measures an aerodynamic drag opposing a vehicle motion, etc.

The CNN is trained by (i) inputting ground truth data including a set of inputs and respective output data, and (ii) backpropagating results to be compared with the ground truth to determine a loss function. Training the CNN includes determining parameters for convolutional and fully-connected layers that minimize the loss function. When trained, a CNN can determine a presence of a radar sensor 130 radome 140 based on the input data. In one example, the computer may be programmed to perform an iterative routine until a difference between the actual output of the neural network and the expected output is less than a specified threshold, e.g., 1%. In other words, the training of the neural network may continue until the trained network can output an expected value in 99% of times. In the present context, "trained" means the difference between the actual output of the neural network and the expected output is less than the specified threshold, e.g., 1%. Training data may include multiple, e.g., 3,1415,926, sets of ground truth data. Test data may include multiple, e.g., 2,718,281 sets of ground truth data. A set of ground truth data may specify (i) values of inputs for the neural network and (ii) expected output(s) including one of "the radar radome is missing" or "the radar radome is present." The computer may be programmed to train the neural network by applying the set of training data including the inputs and expected output for each set of the training data.

After each run of a plurality of tests using ground truth data, the output state of the neural network is back-propagated to compare with the ground truth. Back-propagation is a technique that returns output states from a CNN to the inputs to be compared to corresponding ground truth. During training an output value can be back-propagated to be compared to the expected output included in the ground truth to determine a loss function. The loss function determines how accurately the CNN has processed the input data. A CNN can be executed a plurality of times on a single set of ground truth data while varying weight parameters that control the processing of the CNN. Weight parameters that correspond to correct answers as confirmed by a loss function that compares the output states to the ground truth are saved as candidate parameters. Following the test runs, the candidate parameters that produce the most correct results are saved as the parameters that will be used to program the CNN during operation.

The neural network may be considered "trained," when, upon entering 100 sets of data including various input conditions, the output of the neural network, specifying whether the radome 140 is present, is as expected at least a threshold percentage of times, e.g., 99% of the time. In this example, upon entering 1000 different sets of input data, the trained neural network will correctly determine whether the radome 140 is present for at least 990 sets of input data.

Figure 5:
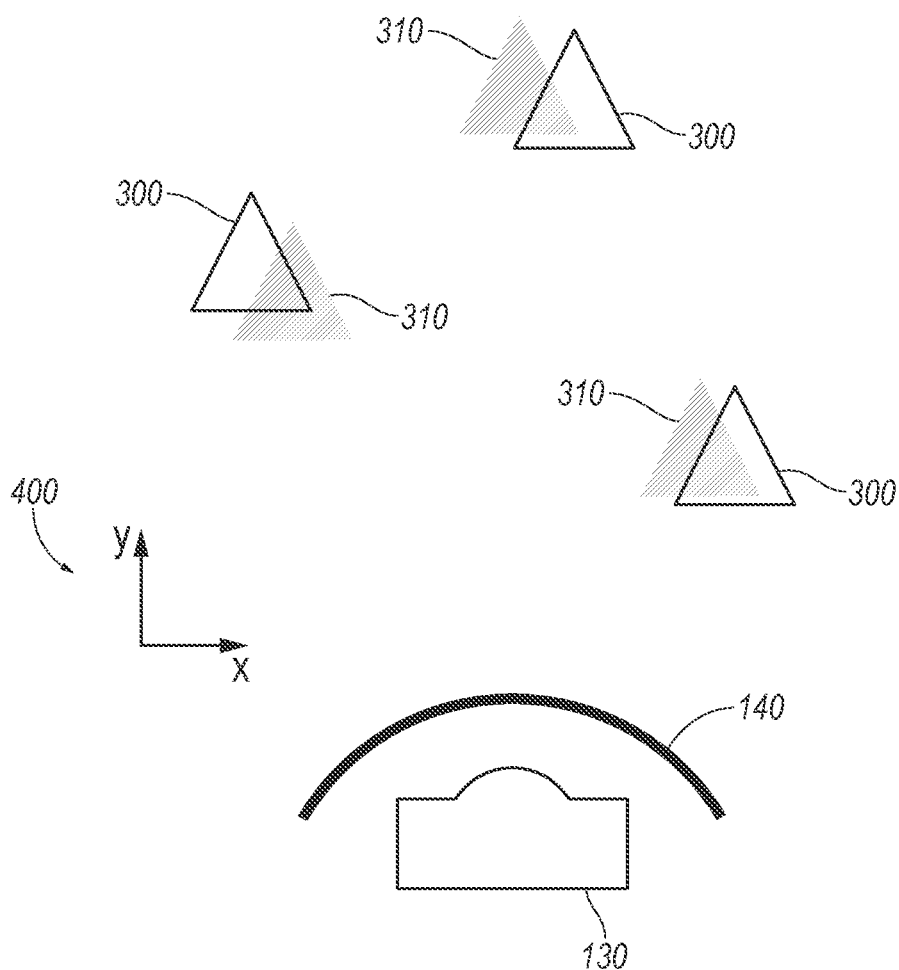
FIG. 5 is a diagram showing a radar sensor and objects detected thereby.

FIG. 5 illustrates an example vehicle 100 radar sensor and a respective radome 140 of the sensor 130 and locations of multiple objects 300 relative to a coordinate system 400. As discussed above, when the radome 140 of a radar sensor 130 is missing, then the radar sensor 130 may identify an object 300 in an incorrect location, e.g., identified as an object 310, and/or cause other types of errors such as reporting a false azimuth angle of an object, an object dimension, etc. Azimuth angle is a horizontal angle measured clockwise from a horizontal coordinate axis, e.g., Y axis. FIG. 5 illustrates further examples of locations of incorrectly detected objects 310. In the example shown in FIG. 5, each incorrectly identified object 310 is a detection of the respective object 300 nearest to a location of the incorrectly identified object 310. In another example, an estimated relative radial velocity may be incorrect, a return signal intensity of reflection from and object may be higher than nominal, a noise floor may increase or decrease relative to a nominal vehicle configuration resulting in incorrect object detection, localization, etc.

The vehicle 100 may include sensors 130 with overlapping fields of view. Thus, the objects 300 of FIG. 5 may be detected by a second vehicle 100 sensor 130, e.g., a camera sensor 130. The computer 110 may be programmed to fuse data received from multiple sensors 130. Data fusion means integrating multiple data sources about a field of view, thereby taking advantage of data obtained via various sensed media, and typically providing more consistent, accurate, and useful information than that provided by any one of the data sources alone. Data fusion typically depends on all sensors 130 providing data to be fused to be calibrated to within a specified amount of accuracy or precision.

Because the sensors 130 may be in different locations of the vehicle 100, having different pose (roll, pitch, yaw), and/or report object data relative to different coordinate systems 400, the computer 110 may be programmed to use extrinsic calibration parameters before fusing the data received from different sensors. Extrinsic calibration parameters mean values that specify a transformation of coordinates from a first sensor coordinate system 400 to a second sensor coordinate system 400. For example, extrinsic calibration parameters may specify (i) a location of the radar sensor 130 coordinate system relative to the coordinate system 400 or a second sensor 130 coordinate system, and (ii) a pose (roll, pitch, and yaw) of the radar sensor 130 relative to the coordinate system 400 or a second sensor 130 coordinate system. Various conventional techniques may be used to determine extrinsic calibration values.

For example, as a result of using extrinsic calibration, a distance between location coordinates of an object 300 reference point received from the radar sensor 130 compared to location coordinates of the object 300 reference point received from a second sensor, e.g., a camera sensor 130, a (light detection and ranging) lidar sensor 130, etc., may be less than a threshold, e.g., 30 centimeters (cm). In other words, the radar sensor 130 and the second sensor 130 may detect features, e.g., objects 300, buildings, traffic signs, vegetation, etc., at similar locations (i.e., a relative distance between the reported object data of the sensors is less than the threshold) relative to a coordinate system 400.

Extrinsic calibrations used for transferring coordinates of data received, e.g., from the radar sensor 130, to coordinates of data received, e.g., from a camera sensor 130, may become obsolete if the intrinsic calibration values of any of the sensors 130 used for sensor fusion change. "Obsolete" in this context means an error in transferring the coordinates of an object exceeds a threshold, e.g., 10 cm distance, 3 degrees yaw, 3 degrees roll, 3 degrees pitch, etc. For example, as discussed above, the intrinsic calibration parameters of a radar sensor 130 are defined such that the object coordinates are reported based on a radar sensor 130 coordinate system. A missing radome 140 typically results in a change in location of the radar sensor 130 coordinate system. Therefore, the extrinsic calibrations which specify a transformation from the radar sensor 130 coordinate system to the second sensor 130 coordinate system may become obsolete.

Sensor fusion error measures a statistical correlation of data received from a radar sensor 130 and a second sensor 130 in a vehicle 100. In the present context, a statistical correlation commonly refers to a degree to which a pair of variables are linearly related, e.g., an average difference between locations and azimuth angles of features, e.g., objects 300. For example, the sensor fusion error may be specified such that the error increases as an average distance and/or a difference in azimuth angles of objects 300 detected by the second sensor 130 and location coordinates of objects 310 detected by the radar sensor 130 increases. The sensor fusion error may be specified with a set of numbers, e.g., relative pose error specified in degrees or radians, relative distance error specified in centimeters (cm), etc. For example, a sensor fusion error may specify (i) 2 degrees in azimuth angle, and (ii) 10 cm in relative distance between location coordinates of the object 300 with respect to data from the radar sensor 130 and the second sensor 130. Additionally or alternatively, the sensor fusion error may be specified with a unitless number calculated on a scale of, e.g., 0 (no error) to 10, calculated based on a combination of location and azimuth angle.

The computer 110 may be programmed to determine the sensor fusion error using a statistical correlation technique based on data received from the sensors 130. For example, the computer 110 may determine that location coordinates of objects 300 detected by the radar sensor 130 are on average 8 cm away from the location coordinates of the same object detected by the vehicle 100 camera sensor 130, and/or an average difference of, e.g., 10 degrees, between azimuth angles of an object 300 based on the data received from the radar sensor 130 and the second sensor 130.

As a result of a missing radome 140, the radar sensor 130 may incorrectly detect an object 310, e.g., reporting wrong location coordinates and/or pose, a ghost object, etc. As discussed above, the computer 110, using statistical correlation techniques, may determine a sensor fusion error of, e.g., 10 cm. The computer 110 may be programmed to determine that a radome 140 is missing upon determining that the sensor fusion error exceeds a specified threshold, e.g., an error of 10 cm exceeds a maximum sensor fusion error threshold of 5 cm. Note that sensor fusion error may increase due to other reasons. Additionally or alternatively, the sensor fusion error may increase as a difference between azimuth angle of an object 300 detected by the camera sensor 130 relative to an azimuth angle of the respective object 310 detected by the radar sensor 130 increases. Sensor fusion error may be specified based on any other type of statistical correlation calculation, e.g., standard deviation. For example, the computer 110 may be programmed to determine that the radome 140 is missing when a standard deviation of sensor fusion error exceeds a threshold, e.g., 2 meters (m). Note, that the second sensor 130 data is assumed to be reliable data, i.e., sensor fusion errors are determined to be related to the radar sensor 130. The computer 110 may be programmed to determine that data received from the second sensor 130, e.g., the camera sensor 130, lidar sensor 130, is good, e.g., upon determining no diagnostic trouble code for camera sensor 130, etc.

The computer 110 may determine the sensor fusion error using a statistical method, e.g., determining an average distance between the reference point of an object detected by the radar sensor 130 relative to location coordinates of the same object detected by the second sensor 130, e.g., a camera sensor 130.

A range of an object detection sensor 130 means a physical distance from the sensor 130 within which an object 300 can be detected. A missing radome 140 may result in a changed radar sensor 130 range. The computer 110 may be programmed to determine the radar sensor 130 detection range based on a number of objects 300 detected by each of the radar sensor 130 and the second sensor 130, in a plurality of respective ranges from the vehicle 100. For example, the computer 110 may store a plurality of ranges, e.g., 10 m, 20 m, . . . , 90 m, 200 m. The computer 110 may be programmed to then determine whether the radar sensor 130 detects objects 300 in each of the ranges. The computer 110 may determine that the radar sensor 130 detects object 300 in ranges of 10 m . . . , 80 m, thereby determining a range of 80 m for the radar sensor 130. The computer 110 may be programmed to determine a changed radar detection range based on data received from the radar sensor 130 and a second sensor 130, e.g., the camera sensor 130. For example, the computer 110 may store data in a computer 110 memory specifying the radar sensor 130 range and camera sensor 130 range.

The computer 110 may determine, based on stored sensor range data, that the radar sensor 130 detection range should be 100 meters (m). However, the computer 110 may determine based on data received from the radar sensor 130 and the second sensor 130 that the radar sensor 130 range is reduced to 80 m. The computer 110 may be programmed to determine that the radar sensor 130 detection range is reduced, e.g., from 100 m to 80 m, upon (i) determining that the second sensor 130 detects an object 300, e.g., within 82 m, from the vehicle 100 whereas the radar sensor 130 is unable to detect the object 300, and (ii) determining that the radar sensor 130 and the second sensor 130 detect an object at a distance of 80 m from the vehicle 100.

A missing or displaced radome 140, e.g., a fallen or hanging bumper, may result in a change in aerodynamic drag of the vehicle 100. Aerodynamic drag is a force that opposes a vehicle 100 motion. The aerodynamic drag of a vehicle 100 is typically based on a vehicle 100 body 120 shape, a vehicle 100 speed, a direction of wind, etc. The computer 110 may be programmed, in accordance with an aerodynamic model of the vehicle 100, to determine the aerodynamic drag of the vehicle 100 based on data including a vehicle 100 speed, a vehicle 100 fuel consumption, an engine torque, and a road slope.

The neural network may be trained to determine whether a radome 140 is missing, e.g., that a front bumper of the vehicle 100 is missing, based on the determined aerodynamic drag, the vehicle 100 speed, an engine torque, etc. For example, the neural network may be trained to determine a missing bumper based on an increase a vehicle 100 fuel consumption compared to fuel consumption of the vehicle 100 with an intact body 120 in combination with an engine torque and/or engine speed for a period of time. The neural network may be trained to determine based on the aerodynamic drag of an intact body 120 an engine torque, engine speed, and gear position to achieve a specified vehicle 100 speed on a specified road slope with a specified wind speed and direction. The neural network may be trained based on training data including missing radome 140 to detect a missing radome 140 based on training data including changes of a fuel consumption, engine torque, etc. when the radome 140 is missing.

The computer 110 may be programmed to detect objects 300 in a field of view of the radar sensor 130 based on received reflections, a detection of a vehicle body 120 part, e.g., the radome 140, as an external and/or proximate object being prevented based at least on a predetermined base reflection pattern, sometimes referred to as a default base reflection pattern.

Vehicle 100 body 120 components such as radome 140 including packaging of a radar sensor 130, bumper, etc., prevent exposure of the radar sensor 130 components, e.g., an antenna, to weather conditions such as rain, snow, wind, etc., which can cause radar signal absorption. Exposure of the radar sensor 130 to the weather conditions may result in a change of a sensor 130 detection characteristics, e.g., detecting an object 310 instead of the object 300, as shown in FIG. 5, which may be due to a higher likelihood of ice, snow buildup on the radar sensor 130 compared to the radome 140. The computer 110 may be programmed to receive weather data specifying a weather condition such as snow, rain, wind, etc.

For example, when a radar sensor 130 radome 140 is missing, atmospheric moisture may impact radar sensor 130 operation, e.g., causing a change of object data resolution. The computer 110 may be programmed to increase an operating frequency and/or an operating power level of the radar sensor 130 upon determining, based on the determined weather condition, a presence of moisture on the radar sensor 130. The computer 110 may be programmed to determine that moisture is present in the radar sensor 130 based on the weather condition and determining that the radar sensor 130 radome 140 is missing.

An absence of radome 140 may result in a higher probability of water or ice formation onto the vehicle 100 body 120. Such an ice formation typically causes a blockage of radar signal and thereby a lack of detections by the radar sensor 130. In other words, the radar sensor 130 may be incapable of detecting object(s) 300 upon the formation of a layer of water or ice on the sensor 130. The computer 110 may be programmed to detect such blockage of the radar sensor 130 based on the received data including the weather conditions and the determination about the lack of the radome 140. Typically, using an object detection algorithm, a radar sensor 130 may detect a blockage however, a detection of a blockage based on the missing radome 140 and weather data may be quicker than conventional blockage detection of radar sensor 130.

The computer 110 may be programmed to adjust an operating parameter of a radar sensor 130 blockage detection algorithm, e.g., setting an output of the algorithm to "blocked," based on the weather condition and the determined missing radome 140. A blockage of a radar sensor 130 may result in a deactivation of an autonomous operation and/or ignoring the radar sensor 130 data for the vehicle 100 operation. Thus, advantageously, quicker detection of a blockage may result is a quicker determination to deactivate a vehicle 100 autonomous operation.

A radar sensor 130 radome 140 may be in a field of view of a vehicle 100 camera sensor 130. The computer may be programmed to receive data from the camera sensor 130, and to apply the trained neural network to the received camera data, wherein the trained neural network is further trained to output the determination concerning the presence of the radar radome based on the received camera sensor 130 data. For example, the neural network may be trained based on the training data to determine based on the camera data whether the radome 140 is present, e.g., detecting an exposed radar sensor 130 as shown in FIG. 2B missing a radome 140.

Additionally or alternatively, the neural network may be trained to determine, based on camera data, whether the radar sensor 130 radome 140 is present. The training data may include image data showing the radome 140 and/or the exposed radar sensor 130 when the radome 140 is missing. Thus, the neural network may be trained to determine based on received image data whether the radome 140 is missing. In one example, data received from a rear camera sensor 130 may include image data showing a rear bumper hanging from a rear part of the body 120, e.g., partially detached from the body 120. Thus, the neural network may be trained to determine based on received image data that the radome 140 is not present at a specified location covering the radar sensor 130, although the specified location of the radome 140 is outside a field of view of the camera sensor 130. In other words, the neural network may be trained to determine based on the camera data that the radome 140 is missing even in scenarios that the field of view of the camera sensor 130 lacks the location of the radome 140. In this example, a hanging bumper entering the field of view of the camera sensor 130 may result in determining that the radome 140 is detached from the specified location.

A vehicle 100 impact such as a collision may result is detaching a radar sensor 130 radome 140. The computer 110 may be programmed to receive vehicle 100 collision data specifying whether a collision occurred, and to apply the trained neural network to the received vehicle collision data, wherein the trained neural network is further trained to output the determination concerning the presence of the radar sensor 130 radome 140 based on the received vehicle 100 collision data. Thus, training data used to train the neural network may include collision data, e.g., specifying a location of impact, e.g., front, rear, right, left, and/or a severity level of impact, e.g., in a scale of 1 (light) to 10 (sever). The collision data may be received from a vehicle 100 airbag ECU, e.g., as a message from the airbag ECU, a stored diagnostic trouble code (DTC) or the like in an airbag ECU memory, etc.

As discussed above, the computer 110 may be programmed to operate the vehicle 100, e.g., in an autonomous mode, based on data received from the object detection sensor(s) 130, e.g., the radar sensor 130. The computer 110 may be programmed to deactivate a vehicle 100 autonomous operation and/or store a DTC or the like specifying that the radar sensor 130 radome 140 is missing, upon determining that the radar sensor 130 radome 140 is missing. In one example, a DTC may have a status including active, clear, etc. In the present context, "active" means the faulty condition associated with the DTC is currently present, e.g., the radome 140 is missing, whereas, a "clear" status means the faulty condition is not present, e.g., the radome 140 is present.

Upon storing a DTC specifying that the radar sensor 130 radome 140 is missing, the vehicle 100 may be navigated to a service center for repair. The vehicle 100 may be repaired at the service center by replacing/installing a new radome 140, and resetting (or erasing) the DTC specifying that the radome 140 is missing. Typically, as a part of a repair/replacement of missing radome 140, the radar sensor 130 is recalibrated, e.g., by determining an updated set of extrinsic calibration parameters and storing the determined extrinsic calibrations in the computer 110 memory.

In some examples, a radome 140 may be repaired or replaced but as a result of an error, the diagnostic code may be left in the computer 110 memory (i.e., not erased). The computer 110 may be programmed, upon determining that (i) based on stored diagnostic code the radar sensor 130 radome 140 is missing and (ii) based on the trained neural network output, the radar sensor 130 radome 140 is present, to output a message, to a user device, including an instruction to adjust one or more calibration parameters of the radar sensor 130.

Figure 6A:
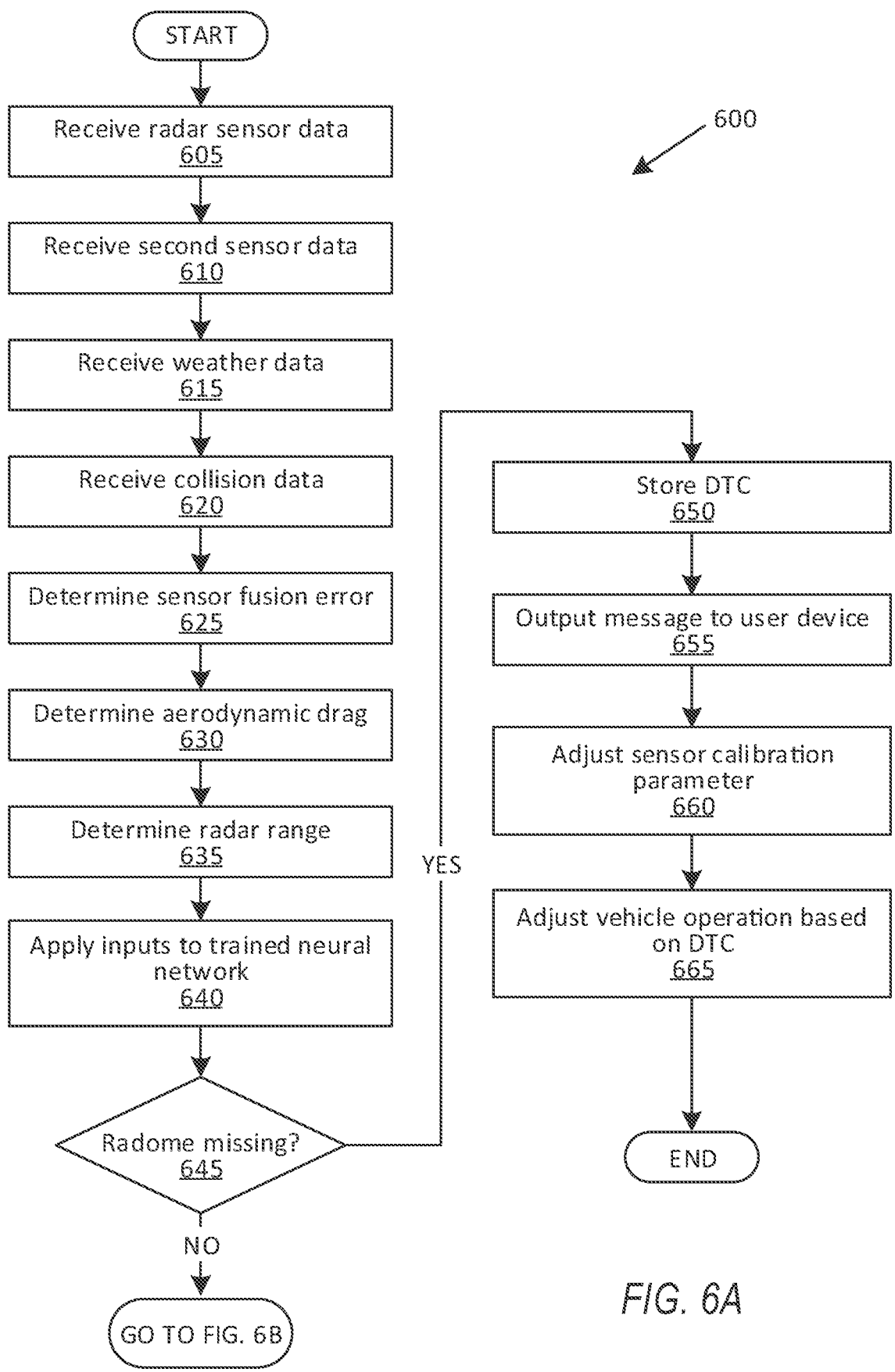
FIG. 6A-6B are a flowchart of an exemplary process for operating a vehicle.
Figure 6B:
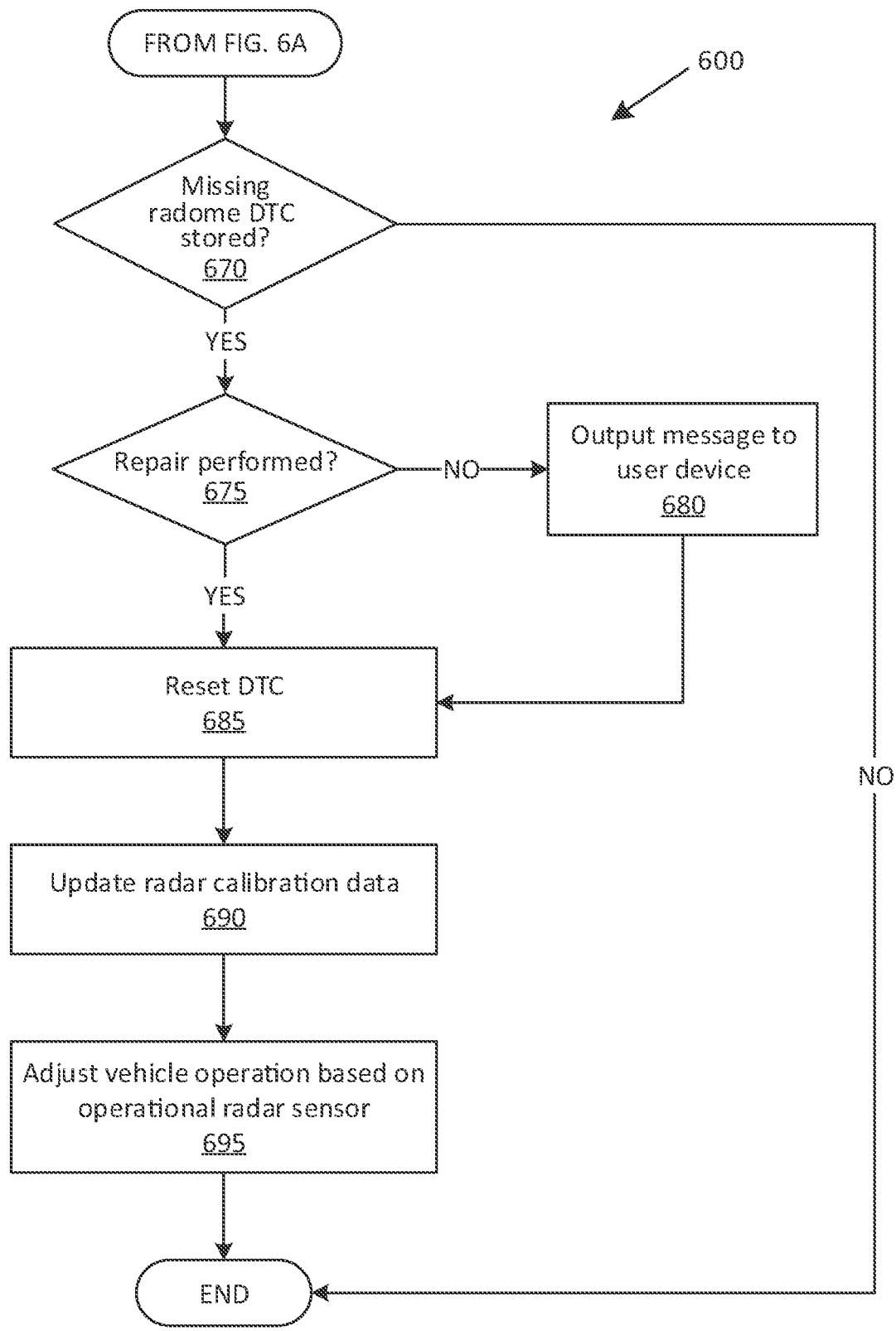

The computer 110 may be programmed, upon determining a lack of the radar sensor 130 radome 140, store a diagnostic code in a computer 110 memory, to adjust one or more parameters of the radar sensor 130, to determine an updated sensor fusion error based at least in part on the adjusted one or more parameters, and to stop adjusting the one or more calibration parameters upon determining that the updated sensor fusion error is less than a specified error threshold. FIG. 6A-6B are a flowchart of an exemplary process 600 for operating a vehicle 100. The vehicle 100 computer 110 may be programmed to execute blocks of the process 600.

With reference to FIG. 6A, the process 600 begins in a block 605, in which the computer 110 receives radar sensor data, i.e., data describing reflections received at the radar sensor 130 for a field of view of the radar sensor 130. The computer 110 may be programmed to determine an amount of reflection from a radar sensor 130 radome, as discussed with respect to FIG. 5.

Next, in a block 610, the computer 110 receives data from a second sensor 130, e.g., typically image data from a vehicle 100 camera sensor 130. A field of view of the second sensor 130 may overlap with the radar sensor 130, e.g., viewing a front of the vehicle 100.

Next, in a block 615, the computer 110 receives weather data. The computer 110 may be programmed to receive, e.g., from a remote computer, data including temperature, participation rate, snow, rain, wind speed, wind direction, etc. The computer 110 may be programmed to determine weather data based on data received from a vehicle 100 sensor 130, e.g., camera sensor 130, rain sensor 130, outside temperature sensor 130, etc.

Next, in a block 620, the computer 110 receives collision data. Collision data may specify a location of impact, e.g., front, rear, right, left, and/or severity of impact, e.g., in a scale of 1 (light) to 10 (sever). Collision data may be stored in a computer 110 memory.

Next, in a block 625, the computer 110 determines sensor fusion error. The computer 110 may be programmed to determine the sensor fusion error based on the received radar sensor 130 data and the second sensor 130 data using a statistical method, e.g., determining an average distance between reference point of an object detected by the radar sensor 130 relative to location coordinates of the same object detected by the second sensor 130.

Next, in a block 630, the computer 110 determines an aerodynamic drag of the vehicle 100. The computer 110 may be programmed to determine the aerodynamic drag by consulting a stored lookup table or the like that provides drag based on data including a vehicle 100 speed, engine torque, gear ratio, road slope, wind speed, and direction, etc.

Next, in a block 635, the computer 110 determines a radar sensor 130 range. The computer 110 may be programmed to determine the radar sensor 130 range based on a number of objects 300 detected by each of the radar sensor 130 and the second sensor 130, in a plurality of ranges from the vehicle 100.

Next, in a block 640, the computer 110 applies the inputs including (1) the sensor fusion error, (2) the radar sensor 130 detection range, (3) the amount of reflection from a radar sensor 130 radome 140, (4) weather data, and (5) the aerodynamic drag of the vehicle 100. The computer 110 may be additionally programmed to apply camera sensor 130 image data and collision data to the trained neural network.

Next, in a decision block 645, the computer 110 determines based on an output of the trained neural network, whether the radar sensor 130 radome 140 is present. The neural network output may include data specifying whether the radar sensor 130 radome 140 is present or missing. If the computer 110 determines that the radome 140 is present, the process 600 proceeds to a block 650; otherwise the process 600 proceeds to a block 670 (FIG. 6B).

In the block 650, the computer 110 stores a DTC specifying that the radome 140 is missing.

Next, in a block 655, the computer 110 outputs a message to a user device. The computer 110 may be programmed to output data to a user device, e.g., a vehicle 100 human machine interface, indicating that a radar sensor 130 radome is missing, thereby a vehicle 100 operation, e.g., an autonomous vehicle 100 operation, may be deactivated.

Next, in a block 660, the computer 110 adjusts one or more calibration parameters of the radar sensor 130. For example, the computer 110 may be programmed to increase an operating frequency and/or a power level of the radar sensor 130 based on the determined weather condition, a presence of moisture in the radar sensor 130, etc.

Next, in a block 665, the computer 110 adjusts a vehicle 100 operation based on the stored DTC. The computer 110 may deactivate an autonomous operation of the vehicle 100 that uses data received from the radar sensor 130, e.g., an adaptive cruise control system or the like.

Following the block 665, the process 600 ends, or alternatively returns to the block 605, although not shown in FIG. 6A.

With reference to FIG. 6B, following the decision block 645, in the decision block 670, the computer 110 determines whether a DTC for missing radome 140 is stored in the computer 110 memory or received from another vehicle 100 computer 110. If the computer 110 determines that the DTC for missing radome 140 is stored in the computer 110 memory, then the process 600 proceeds to a decision block 675; otherwise the process 600 ends, or alternatively returns to the block 605, although not shown in FIGS. 6A-6B.

In the decision block 675, the computer 110 determines whether a repair of the radar sensor 130 and/or radar sensor 130 radome 140 was performed. The computer 110 may store maintenance information in a computer 110 memory and/or may receive from another vehicle 100 computer 110 or a remote computer. The maintenance information may specify a type of repair performed, a date of repair, identifier of components repaired or replaced, etc. If the computer 110 determines that a repair concerning the radar sensor 130 and/or the radome 140, e.g., replacing the bumper, was performed, then the process 600 proceeds to a block 685; otherwise the process 600 proceeds to a block 695.

In the block 680, the computer 110 outputs a message to a user device, e.g., including data specifying a missing radar sensor 130 radome 140. The output message may include a location of the missing radome 140, e.g., front, rear, etc. Following the block 680, the process 600 ends, or alternatively returns to the block 605, although not shown in FIGS. 6A-6B.

In the block 685, the computer 110 resets (or clears) the DTC for missing radome 140. The computer 110 may clear the DTC by changing the status of the DTC from active to clear in a computer 110 memory.

Next, following the block 685, in a block 690, the computer 110 updates radar calibration data. The computer 110 may be programmed to update extrinsic calibration data to adjust radar sensor operation after replacement of the radar sensor 130 and/or replacement of a radome 140. Upon replacing a radar sensor 130 and/or a radome 140, the previously stored extrinsic calibration parameters should typically be updated. Conventional calibration methods may be used to update extrinsic calibration parameters and store the updated parameters, e.g., in a computer 110 memory.

Next, in a block 695, the computer 110 adjusts a vehicle 100 operation based on determining that the radar sensor 130 is operation. A previously stored DTC for missing radome 140 may have deactivated a vehicle 100 operation, e.g., an autonomous propulsion, steering, or braking. As a result of resetting the DTC (with referent to the block 685), the computer 110 may be programmed to adjust the vehicle 100 operation by, e.g., activating the vehicle 100 autonomous operation.

Figure 7:
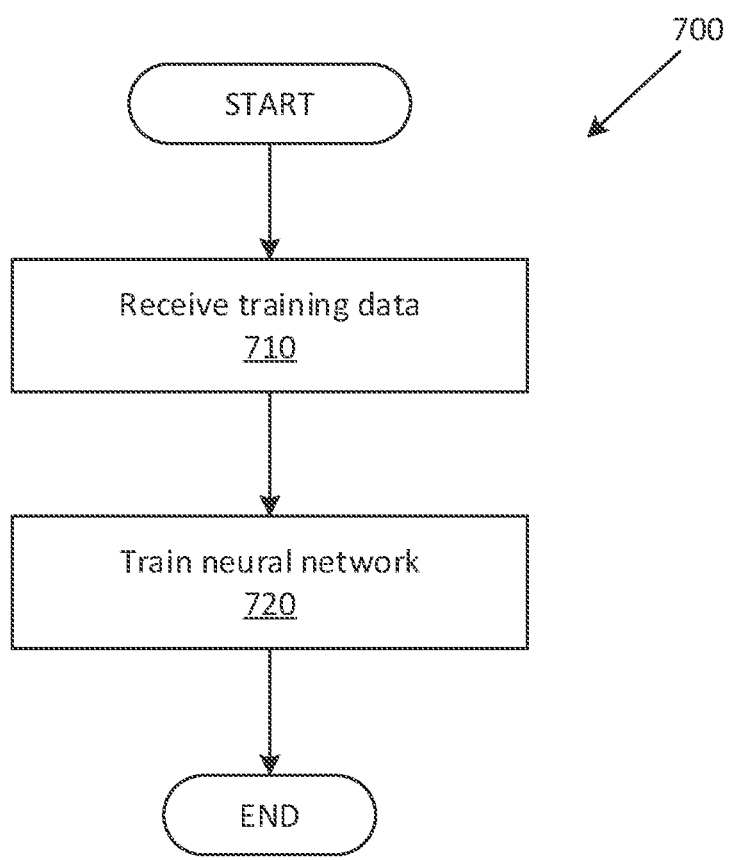
FIG. 7 is a flowchart of an exemplary process for training a neural network for determining whether a radar sensor radome is present in or on a vehicle.

FIG. 7 is a flowchart of an exemplary process 700 for training a neural network for determining whether radar sensor 130 radome 140 is present. A computer, e.g., a vehicle 100 computer 110, a remote computer, etc., may be programmed to execute the blocks of the process 700.

The process begins in a block 710, in which the computer receives the training data. The training data (or ground truth data) specify (i) values of inputs for the neural network and (ii) an expected output including one of "the radar radome is missing" or "the radar radome is present."

Next, in a block 720, the computer trains the neural network. The computer may be programmed to apply the training data to the neural network. In one example, the computer may be programmed to perform an iterative routine until a difference between the actual output of the neural network and the expected output is less than a specified threshold, e.g., 1%. In other words, the training of the neural network may continue until the trained network can output an expected value in 99% of times, e.g. for 1,414,213 epochs.

Following the block 720, the process 700 ends, or alternatively returns to the block 710, although not shown in FIG. 7.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, Python, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor such that the computer is programmed to:
input to a trained machine learning program, (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion; and
output from the trained machine learning program a determination concerning a presence of the radar radome.

2. The computer of claim 1, wherein the second sensor includes a camera sensor or lidar sensor, and the instructions further include instructions to:
receive data from the second sensor; and
apply the trained machine learning program to the received second sensor data, wherein the machine learning program is further trained to output the determination concerning the presence of the radar radome based on the received second sensor data.

3. The computer of claim 1, wherein the instructions further include instructions to:
receive vehicle collision data specifying whether a collision occurred; and
apply the machine learning program to the received vehicle collision data, wherein the machine learning program is further trained to output the determination concerning the presence of the radar radome based on the received vehicle collision data.

4. The computer of claim 1, wherein the instructions further include instructions to:
upon determining a lack of the radar radome, store a diagnostic code in a computer memory;
adjust one or more calibration parameters of the radar sensor;
determine an updated sensor fusion error based at least in part on the adjusted one or more calibration parameters; and
stop adjusting the one or more calibration parameters upon determining that the updated sensor fusion error is less than a specified error threshold.

5. The computer of claim 4, wherein the instructions further include instructions to increase at least one of an operating frequency or an operating power level of the radar sensor upon determining, based on the weather data, a presence of moisture on the radar sensor.

6. The computer of claim 4, wherein the instructions further include instructions to adjust an operating parameter of a radar sensor blockage detection algorithm based on the weather data.

7. The computer of claim 1, wherein the instructions further include instructions, upon determining that (i) based on stored diagnostic code the radar radome is missing and (ii) based on the machine learning program output, the radar radome is present, to output a message, to a user device, including an instruction to adjust one or more calibration parameters of the radar sensor.

8. The computer of claim 1, wherein the instructions further include instructions to deactivate a vehicle autonomous operation upon determining that the radar radome is missing.

9. The computer of claim 1, wherein the instructions further include instructions to determine the radar detection range based on a number of objects detected by each of the radar sensor and the second sensor, in a plurality of ranges from the vehicle.

10. The computer of claim 1, wherein the instructions further include instructions to train the machine learning program by applying a set of training data including the inputs and an expected output including one of "the radar radome is missing" or "the radar radome is present" for each set of the training data.

11. The computer of claim 1, wherein the instructions further include instructions to determine the weather data including data concerning snow, rain, or wind.

12. The computer of claim 1, wherein the instructions further include instructions to determine the aerodynamic drag of the vehicle based on data including a vehicle speed, a vehicle fuel consumption, an engine torque, and a road slope.

13. A method, comprising:
inputting to a trained machine learning program, (1) a sensor fusion error that measures a statistical correlation of data received from a radar sensor and a second sensor in a vehicle, (2) a radar detection range, (3) an amount of reflection from a radar radome, (4) weather data, and (5) aerodynamic data that measures an aerodynamic drag opposing a vehicle motion; and
outputting from the trained machine learning program a determination concerning a presence of the radar radome.

14. The method of claim 13, further comprising:
receiving data from the second sensor; and
applying the trained machine learning program to the received second sensor data, wherein the machine learning program is further trained to output the determination concerning the presence of the radar radome based on the received second sensor data.

15. The method of claim 13, further comprising:
upon determining a lack of the radar radome, storing a diagnostic code in a computer memory;
adjusting one or more calibration parameters of the radar sensor;
determining an updated sensor fusion error based at least in part on the adjusted one or more calibration parameters; and
stopping adjusting the one or more calibration parameters upon determining that the updated sensor fusion error is less than a specified error threshold.

16. The method of claim 15, further comprising increasing at least one of an operating frequency or an operating power level of the radar sensor upon determining, based on the weather data, a presence of moisture on the radar sensor.

17. The method of claim 15, further comprising adjusting an operating parameter of a radar sensor blockage detection algorithm based on the weather data.

18. The method of claim 13, further comprising, upon determining that (i) based on stored diagnostic code the radar radome is missing and (ii) based on the machine learning program output, the radar radome is present, outputting a message, to a user device, including an instruction to adjust one or more calibration parameters of the radar sensor.

19. The method of claim 13, further comprising training the machine learning program by applying a set of training data including the inputs and an expected output including one of "the radar radome is missing" or "the radar radome is present" for each set of the training data.

20. The method of claim 13, further comprising determining the aerodynamic drag of the vehicle based on data including a vehicle speed, a vehicle fuel consumption, an engine torque, and a road slope.

* * * * *